July 19, 1927.

O. T. ADAMS

WIND MOTOR

Filed June 3, 1926

Inventor:
O. T. Adams
By Monroe E. Miller
Attorney.

July 19, 1927.

O. T. ADAMS

WIND MOTOR

Filed June 3, 1926

Inventor:
O. T. Adams
By Monroe E. Miller
Attorney

July 19, 1927. 1,636,449
O. T. ADAMS
WIND MOTOR
Filed June 3, 1926   5 Sheets-Sheet 3

Inventor:
O. T. Adams
By Monroe E. Miller
Attorney

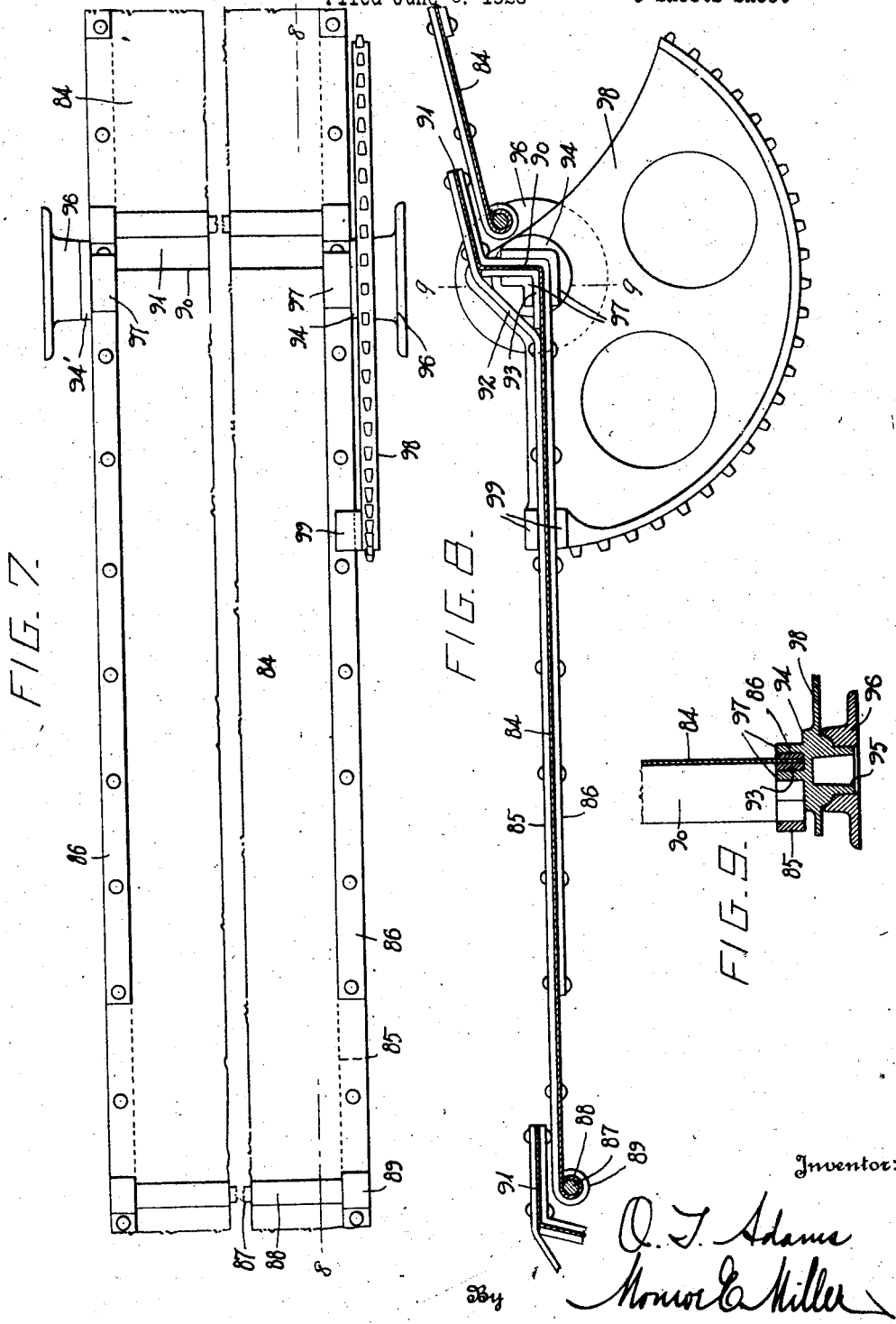

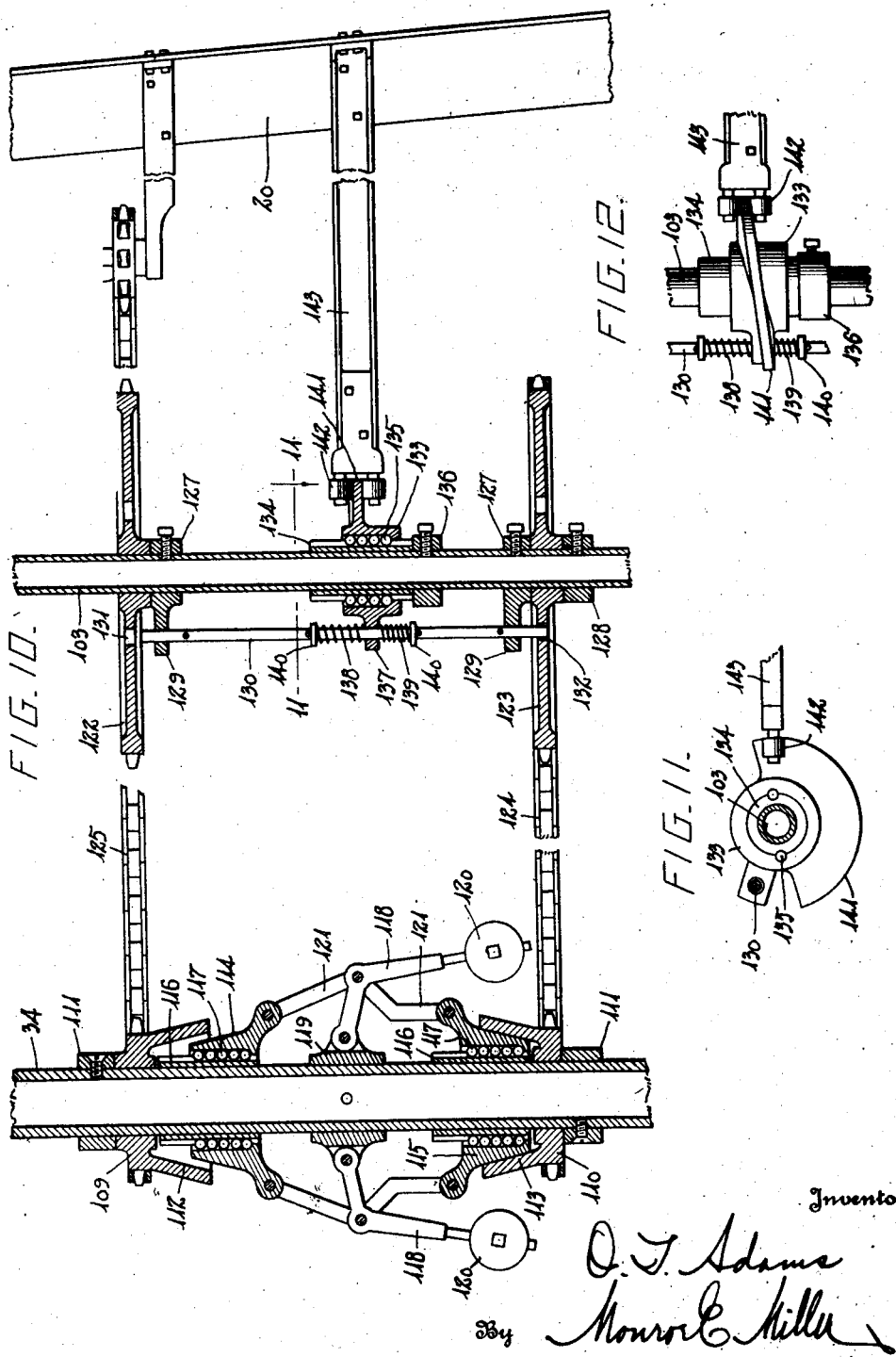

Patented July 19, 1927.

1,636,449

UNITED STATES PATENT OFFICE.

OMER T. ADAMS, OF LOS ANGELES, CALIFORNIA, ASSIGNOR TO ADAMS MULTIPLE AIR TURBINE CORPORATION, OF LOS ANGELES, CALIFORNIA, A CORPORATION OF CALIFORNIA.

WIND MOTOR.

Application filed June 3, 1926. Serial No. 113,511.

The present invention relates to wind mills or motors, and is particularly an improvement over the wind motor disclosed in my Patent No. 1,441,774, granted Jan. 9, 1923.

An object of the invention is the provision of automatic means for controlling and operating the governor or devices which control the flow of air to the propeller or wind wheel, especially for the purpose of affording protection against excessive power or speed when the wind is abnormal, such as during a storm or tornado.

Another object is the provision of a governor of novel and improved construction for controlling the flow of air to the propeller or wind wheel.

A still further object is the provision of novel means for mounting the vertical shaft of the propeller or wind wheel within the tower.

The invention also aims to improve the construction generally and in its details, to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 7 is a fragmentary elevation of one of the governor units.

Fig. 8 is a section on the line 8—8 of Fig. 7.

Fig. 9 is a section on the line 9—9 of Fig. 8.

Fig. 10 is a vertical section, with portions shown in elevation, of the automatic governor operating mechanism.

Fig. 11 is a section on the line 11—11 of Fig. 10.

Fig. 12 is a side elevation of the parts shown in Fig. 11.

Figures 1, 6:
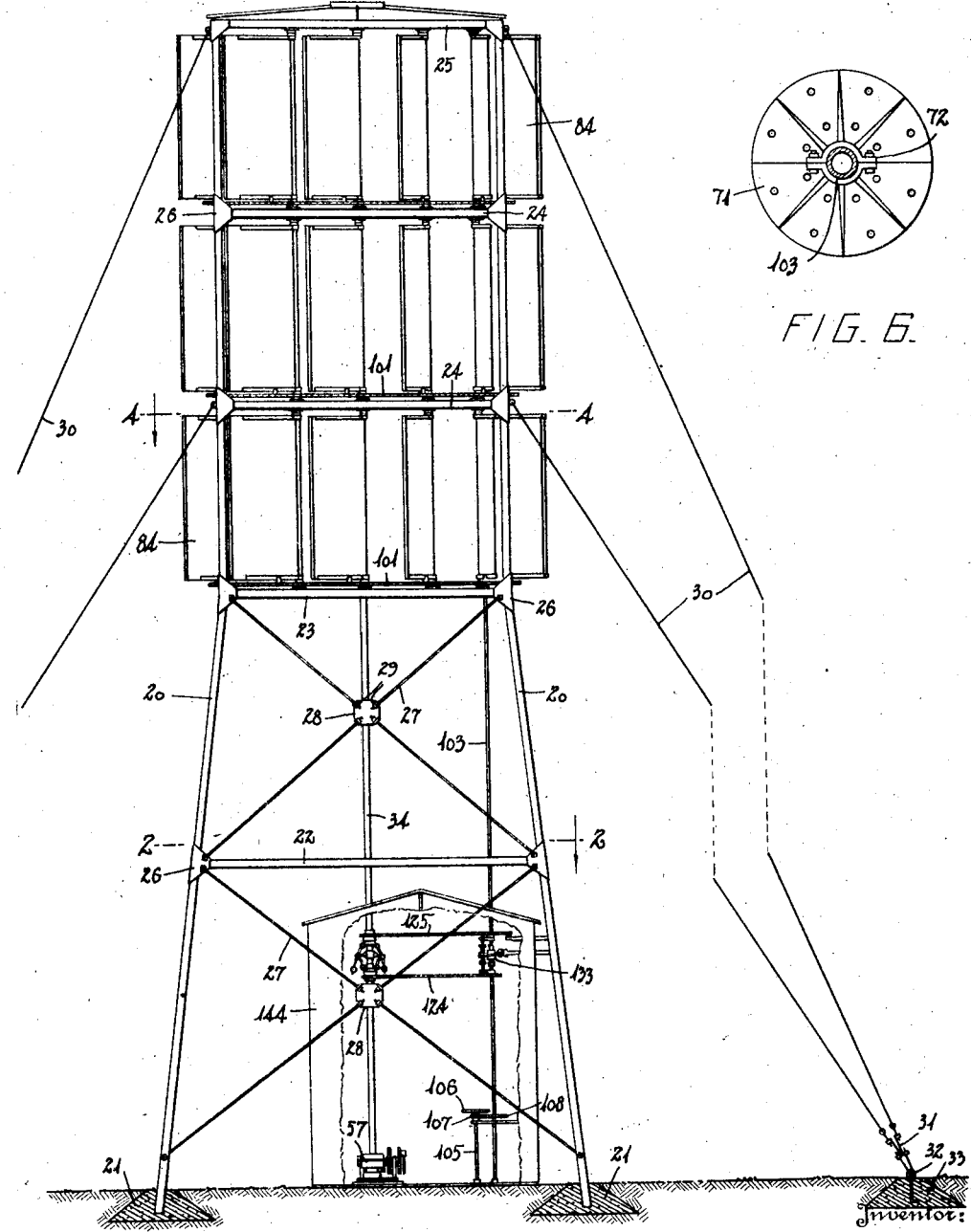
Figure 1 is a side elevation of the improved wind motor, portions being broken away.
Fig. 6 is a plan view of one of the hubs of said propeller or wind wheel.

A skeleton tower frame is provided, which is of square outline as shown, although the tower may be built in various shapes, and comprises the corner posts or legs 20 of angle iron or other suitable material, which have their lower ends embedded and anchored within concrete sleepers 21 or other suitable base or foundation. The posts 20 are connected by horizontal cross pieces 23, 24 and 25, which have their ends secured to angle corner pieces 26 straddling and secured to the legs or posts 20. The posts 20 are inclined and converge upwardly to the cross pieces 23 and are vertical and parallel above said cross pieces. The tapered portion of the tower is braced, between the cross pieces 22 and 23, and below said cross pieces 22, by means of diagonal brace rods 27 connected to the angle pieces 26 and posts 20 and converging to coupling plates 28 having portions through which the inner terminals of the rods extend, with nuts 29 on said inner terminals of the rods for tightening the rods. The tower frame is comparatively light in weight, but is nevertheless strong in construction.

Guy wires 30 are connected to the upper end of the frame, and to the frame at a point lower down, and are connected by turnbuckles 31 with anchors 32 embedded within sleepers 33 embedded in the ground, in order to prevent the tower from being tilted or blown over by strong winds.

Figure 2:
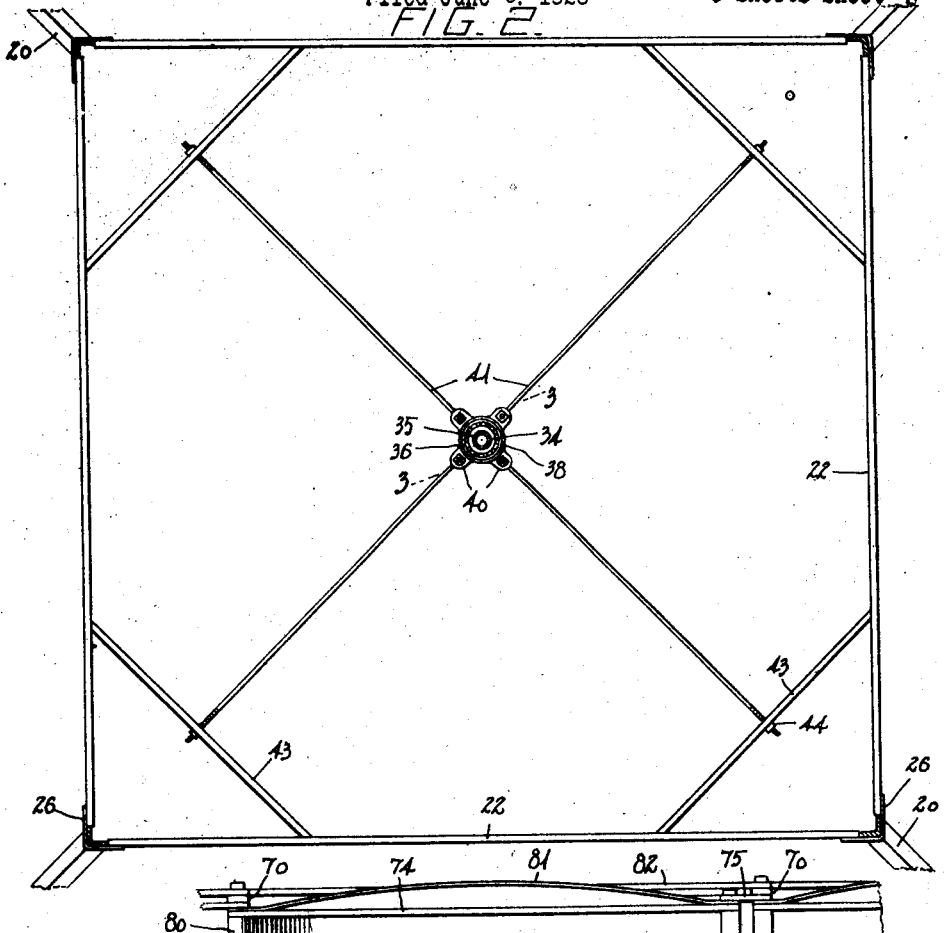
Fig. 2 is a horizontal section on the line 2—2 of Fig. 1, with portions underneath omitted.
Figure 5:
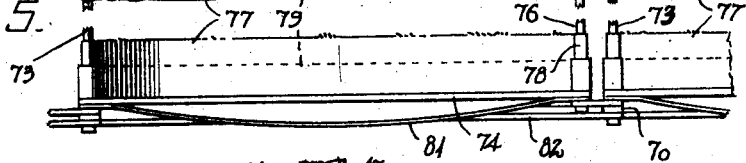
Fig. 5 is a fragmentary elevation of one of the propeller or wind wheel units.
Figure 3:
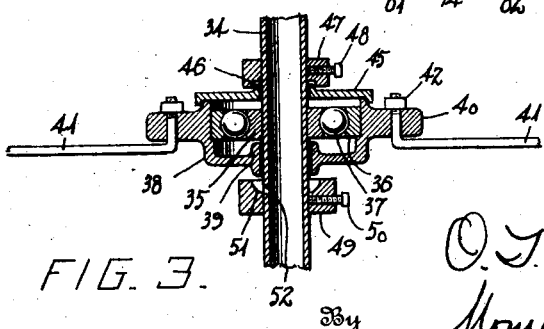
Fig. 3 is an enlarged sectional detail on the line 3—3 of Fig. 2.

A vertical propeller shaft 34 carrying the propeller or wind wheel, as hereinafter described, is located centrally within the frame, and is of tubular construction as shown. Bearings for the shaft 34 are provided at points between the upper and lower ends of the frame, and one bearing, as seen in Fig. 2, is disposed in the horizontal plane of the cross pieces 22, and a similar bearing is also provided in the horizontal plane of the cross pieces 23. Each bearing, as seen in Fig. 3, comprises a collar or ring 35 on the shaft 34 and having an external ball race, a ring 36 surrounding the collar 35 and having an internal ball race, and balls 37 between said collar and ring. The ring 36 is fitted within a cup 38, which may hold lubricant for lubricating the bearing, and said cup has a boss 39 at the bottom thereof with an opening through which the shaft 34 extends. The boss rises above the bottom of the cup for retaining lubricant in the cup, and lubricant which overflows the boss 39 will run down the shaft 34 through the opening of the boss. The rim of the cup 38 has outstanding apertured ears 40 through which are engaged the upturned inner terminals of stay rods 41, and nuts 42 are threaded on said terminals of the rods to secure them to the ears 40. The rods 41 extend toward the corners of the frame, as seen in Fig. 2, and their outer terminals extend through oblique corner-braces 43 secured to the cross pieces 22, and nuts 44 are threaded on said outer terminals of the rods 41 and seat against the braces 43 to tighten said stay rods 41. By adjusting the nuts 44, the bearing and shaft may be adjusted in the horizontal plane of the bearing, to bring the shaft to a true plumb position. The stay rods 41 and braces 43 also assist in strengthening the tower frame. A cap 45 is disposed over the mouth of the cup 38 and has a central opening through which the shaft 34 extends, with an upturned lip 46 surrounding the opening to prevent water on the cap from running into the cup. A collar 47 is secured on the shaft 34 above the cap 45, by means of a set screw 48, or the like, and has a lower recess receiving the lip 46, to exclude rain, snow and other foreign matter from the opening of the cap 45. The collar 47 may be loosened and raised, to permit the cap 45 to be raised, for pouring lubricant into the cup 38. A collar 49 is secured on the shaft 34, by a set screw 50 or otherwise, below the cup 38, and has an upper recess 51 below the boss 39 to receive lubricant that flows down the shaft 34 from the cup 38, and the shaft 34 has an aperture 52 at the bottom of the recess 51 so that lubricant caught in the recess 51 will flow through the aperture 52 into the shaft and down the interior of the shaft.

Figure 13:
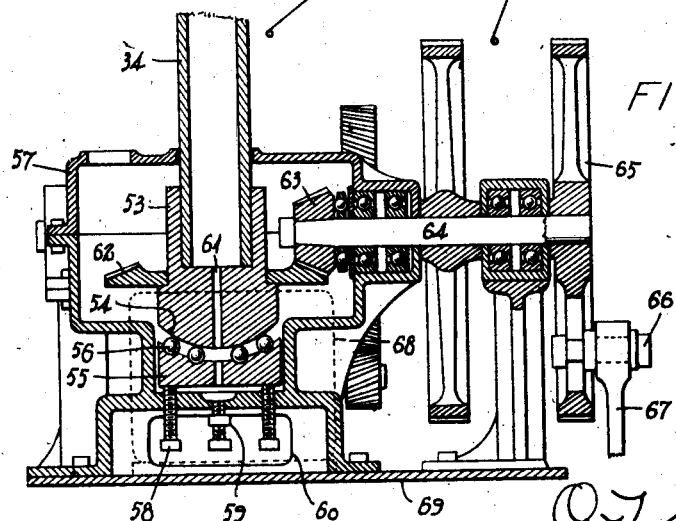
Fig. 13 is a vertical section showing the step bearing of the propeller or wind wheel shaft and the power transmitting mechanism.

The step bearing for the lower end of the shaft 34, as seen in Fig. 13, includes a pivot member 53 fitted on the lower terminal of the shaft and having a convex bottom surface 54 disposed over a bearing member 55 having upper annular ball races in which balls 56 are seated for rolling movement around the vertical axis of the shaft, the bottom of the pivot member 53 seating on the balls 56 thereby enabling the lower end of the shaft to find its own center. The step bearing is disposed within a casing 57, and the bearing member 55 is seated on adjusting screws 58. A drain plug 59 is screw-threaded in the bottom of the casing 57 and may be removed for draining the lubricant from said casing, the casing having a hand-hole 60 for access to the screws 58 and 59.

The power is transmitted from the shaft 34 by way of the pivot member 53, a bevel gear wheel 62 being secured on the member 53 and meshing with a bevel pinion 63 secured on a horizontal shaft 64 mounted in suitable bearings. The shaft 64 is connected by suitable gearing with a crank wheel 65 having the crank pin 66 with a pitman or connecting rod 67 connected thereto, for operating a pump. An electric generator 68 is also geared to the shaft 64 in order that electrical current may be generated by the wind motor. The casing 57, electric generator 68 and bearing pedestals for the transmission gearing are mounted on a suitable base plate 69.

Figure 4:
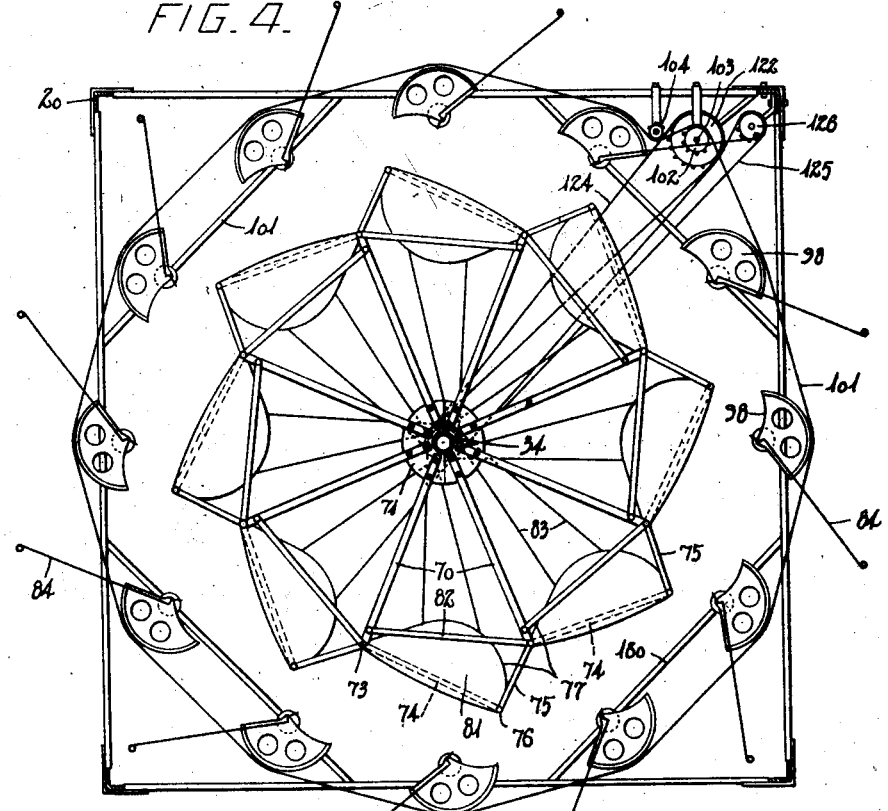
Fig. 4 is a horizontal section taken substantially on the line 4—4 of Fig. 1.

The propeller or wind wheel is mounted on the shaft 34 within the upper portion of the tower frame and includes a plurality of superposed sections or units which are of duplicate construction, and any number of said sections or units may be used. Each propeller unit comprises upper and lower spokes 70 having their inner terminals bolted or otherwise secured to the flanges or disks 71 of hubs or clamps 72 embracing the shaft 34. The hubs or clamps 72 and flanges 71 are split, as seen in Fig. 6, so as to be readily clamped on the shaft. Vertical rods 73 are engaged through the outer terminals of the spokes 70, and outwardly extending bars 74 and 75 are engaged with the rods 73 at the upper and lower ends thereof, and converge together beyond the ends of the spokes 70. The adjacent ends of the pairs of bars 74 and 75 are engaged with vertical rods 76. The propeller blades or buckets 77 are curved transversely, being bent from sheets of metal, and the vertical edge portions of the blades 77 are bent around the rods 73 and 76, as at 78. The upper and lower end portions of the blades 77 are reenforced by bars 79 secured thereto and having their terminals also bent around the rods 73 and 76, as at 80. The blades or buckets have the ends 81 which are of scoop shape, with convexed forward edges projecting beyond the bars 74, so as to catch the air effectively. The blades or buckets are arranged in oblique positions, as seen in Fig. 4. Brace bars 82 are connected at their forward ends to the terminals of the rods 73, and are secured at their rear terminals to the spokes 70 next in rear, and stay wires 83 connect the buckets or blades and hubs, to provide a thoroughly rigid structure.

As shown, there are three propeller units, in the three spaces provided between the horizontal planes of the cross pieces 23, 24 and 25, and a governor unit surrounds each propeller section or unit for controlling the flow of air currents to the propeller.

The governor units are of similar construction, and each governor unit includes an annular series or set of vertical air deflecting wings or vanes 84, constructed of suitable sheet metal. Said wings are hingedly mounted within the tower frame around the propeller, with their inner edges close to the blades or buckets of the propeller, and said wings are adapted to be swung outwardly for directing the air effectively into the propeller buckets or blades. Inner and outer metal bars or straps 85 and 86, respectively, are riveted or otherwise secured to the wings 84 along the upper and lower ends thereof, for stiffening said wings. A vertical reenforcing rod 87 extends along the outer edge of each wing 84, and the outer edge portion of the wing is bent around said rod, as at 88, and the outer ends of the bars or straps 85 are also bent around the rods 87, as at 89, while the straps 86 terminate short of said rods. The inner edge portions of the wings 84 are offset inwardly to provide the shoulder portions 90 and offset portions 91, and when the wings are swung to closed position, as seen in Fig. 8, the offset portion of each wing receives the outer edge portion of the companion wing, with the outer edge portions of the wings bearing against the offset portions 91. The inner terminals of the straps 86 extend along the portions 90 and 91, and the inner terminals of the straps 85 are secured to the portions 91, and said straps 85 have the oblique bracing portions 92 extending across the corners of the wings behind the portions 90. Angle pieces 93 are secured within said corner portions of the wings between the bracing portions 92 and the wings. This provides a substantial construction, and the bends of the wings extending throughout the lengths of the wings will, with the rods 87, reenforce and stiffen the wings.

In order to mount the governor wings for swinging or turning movement about vertical axes, upper and lower pivot members 94' and 94 are provided, which have the studs 95 mounted for turning movement in the bearings 96 secured to the tower frame. The pivot members 94 and 94' have the angular flanges 97 projecting therefrom to receive between them the straps 86 and angle pieces 93, whereby each wing is fitted between and engaged with a pair of pivot members 94—94', to mount the wing for swinging movement about a vertical axis. The pivot members and wings are readily assembled and separated, and provide a desirable structure.

The lower pivot members 94 have sprocket segments 98 for turning the wings, and the segments 98 have upstanding lugs 99 between which the bars or straps 85—86 are engaged, thereby effectively turning the wings with said sprocket segments.

The bearings 96 are secured to the cross pieces 23, 24 and 25 and to oblique braces 100 secured to said cross pieces, as seen in Fig. 4.

The governor wings are all turned simultaneously. Thus, an endless sprocket chain 101 is trained around the segments 98 of each governor unit or section, and around a sprocket wheel 102 on a vertical governor shaft 103 journaled within the tower frame at one corner thereof. An idler sprocket wheel 104 is provided for each sprocket chain 101, to hold the sprocket chain in engagement with the adjacent segment 98, as seen in Fig. 4. Thus, when the governor shaft 103 is rotated, the sprocket segments 98 of the governor wings are turned, in order that said wings may be swung inwardly or outwardly.

The governor shaft 103 may be rotated manually by means of a shaft 105 journaled in the frame at one side of the shaft 103 at the base or foundation of the structure, and having a hand wheel 106 at its upper end to be rotated by hand. The shaft 105 has a pinion 107 meshing with a gear wheel 108 on the governor shaft 103, in order that the governor shaft may be conveniently turned by the manual rotation of said hand wheel.

The automatic mechanism for controlling and operating the governor includes operative connections between the propeller shaft 34 and governor shaft 103 with clutches controlled by the velocity of the propeller shaft. Upper and lower sprocket wheels 109 and 110 are rotatable loosely on the shaft 34, and seat against collars 111 secured on said shaft. The sprocket wheels 109 and 110 have the flared annular flanges 112 and 113, respectively, providing clutch sockets in which clutch cones or members 114 and 115 are engageable, respectively. The clutch cones or members 114 and 115 are slidable on the shaft 34 and are rotatable with said shaft. As shown, sleeves 116 are secured on the shaft and said cones are slidable on said sleeves, the sleeves and cones having registering longitudinal grooves in which balls 117 are disposed to spline or feather the cones on the shaft. The balls 117 permit the cones to move upwardly and downwardly freely with minimum friction. Bell crank levers 118 are pivoted to a collar 119 secured on the shaft 34 between the clutch cones, and carry weights 120 for swinging the levers 118 outwardly and upwardly by centrifugal force when the shaft 34 is rotated. The levers 118 are connected by links 121 with the clutch cones, to move said cones upwardly as the speed of the shaft 34 is increased, and to move the cones downwardly when the speed of the shaft is decreased. Thus, the cone 115 wedges into the clutch socket 113 when the shaft 34 slows down almost to a stop, and when the speed of the shaft 34 is increased up to a maximum or abnormal amount, such as during a hurricane or storm, the cone 114 is moved into the clutch socket 112 to rotate the sprocket wheel 109 with the shaft 34. Upper and lower sprocket wheels 122 and 123, of larger diameter than the sprocket wheels 109 and 110, are mounted for rotation on the governor shaft 103. An endless sprocket chain 104 is trained around the sprocket wheels 110 and 123, and an endless sprocket chain 125 passes around the sprocket wheel 109 and an idler sprocket wheel 126 carried by the frame, with both runs of the sprocket chain 125 at one side of the sprocket wheel 122 and the adjacent run meshing with said sprocket wheel 122, whereby the sprocket wheels 122 and 123 are rotated in opposite directions when actuated by the propeller shaft 34. Collars 127 and 128 are secured on the shaft 103 by set screws, or otherwise, the sprocket wheel 122 seating on the upper collar 127, and the lower sprocket wheel 123 being located between the lower collar 127 and the collar 128. The collars 127 have apertured ears 129 projecting therefrom and through which is slidable a vertical clutch rod 130, the upper and lower ends of which are engageable alternately in apertures 131 and 132 in the respective wheels 122 and 123, when the rod 130 is moved upwardly and downwardly. The clutches between the sprocket wheels 109, 110 and propeller shaft 34 are alternately closed by the speed controlled means on said shaft, as the speed of the shaft is increased or decreased, whereas the clutch connections between the sprocket wheels 122, 123 and governor shaft 103 are alternately closed by the rotation of the shaft 103 in opposite directions for opening and closing the governor wings 84. The clutch rod 130 is moved upwardly and downwardly by the rotation of the shaft 103 in opposite directions. Thus, a member 133 is rotatable with and slidable on the shaft 103, similar to the mounting of the clutch cones on the shaft 34. A sleeve 134 is secured on the shaft 103, and the sleeve 134 and member 133 have registering longitudinal grooves in which balls 135 are disposed, to provide for the free upward and downward movement of the member 133 on the shaft 103, but compelling said member to turn with the shaft. The sleeve 134 is disposed above a collar 136 secured on the shaft 103, and the member 133 has an outstanding apertured ear 137 through which the rod 130 extends. Coiled compression springs 138 and 139 surround the rod 130 above and below the ear 137, respectively, and are confined between said ear and collars 140 secured on the rod 130. The member 133 has a helical flange 141 outstanding therefrom and movable between a pair of rollers 142 carried by a bracket 143 secured in the frame, whereby the turning movement of the member 133 with the shaft 103 moves said member upwardly and downwardly.

The mechanism, as shown in Fig. 10, is in the position it assumes when the propeller is slowing down almost to a stop and the sprocket wheel 123 connected with the governor shaft 103 preparatory to opening the governor. The governor shaft 103 is in closed position, as seen in Fig. 10, with the governor wings 84 swung to closed position. When the speed of the shaft 34 is reduced, so that the clutch cone 115 wedges into the clutch socket 113, the sprocket wheel 110 is driven by the propeller shaft 34, due to the momentum of the propeller, thereby rotating the sprocket wheel 123. When the governor shaft 103 was rotated to close the governor, the member 133 having been rotated, will be moved downwardly, thereby compressing the spring 139 and forcing the clutch rod 130 downwardly, so that said rod moves into one of the apertures 132 of the wheel 123, thereby rotating the shaft 103 with said wheel 123, it being noted that the rod 130, collars 127 and member 133 rotate with the shaft 103. Thus, as the propeller slows down and the clutch between the sprocket wheel 110 and shaft 34 is closed, the shaft 103 is turned by the momentum of the propeller shaft, to open the governor wings 84 more or less, depending on the momentum of the propeller as it practically comes to a stop. When the governor wings 84 are swung open, the air current may flow into and through the wind mill, and the wings or vanes 84 direct the air toward and into the buckets or blades of the propeller, thereby rotating the propeller. The wings 84 may be swung open different amounts, either by the manual or automatic operation of the governor shaft 103. Should the speed of the propeller become excessive, due to a storm, the speed actuated means, including the weighted arms or levers 118, will move the clutch cone 114 into the clutch socket 112, at a predetermined abnormal speed, thereby connecting the sprocket wheel 109 with the shaft 34, and rotating the sprocket wheel 122. During the turning movement of the shaft 103 in opening the governor wings, the rotation of the member 133 will cause said member to move upwardly, due to the movement of the helical flange 141 between the rollers 142, thereby relieving the pressure on the spring 139 and compressing the spring 138, to thrust the rod 130 upwardly against the wheel 122 or into one of the apertures 131 thereof. Consequently, when the wheel 122 is rotated by the closing of the clutch between the sprocket wheel 109 and shaft 34, the shaft 103 is turned in the direction to swing the governor wings 84 to closed position, thereby shutting off the air current from the propeller, and the propeller will then slow down. During the turning movement of the shaft 103 to close the governor, the member 133 being turned will be moved downwardly, as hereinbefore described, thereby depressing the rod 130, to remove said rod from the wheel 122 and bring the rod into engagement with the wheel 123, so that when the propeller has almost come to a stop, and the clutch between the sprocket wheel 110 and shaft 34 is closed, the wheel 123 being rotated will thereby rotate the shaft 103 to open the governor more or less as above described. This automatic action of the governor may be repeated, and if after the first action the governor wings are opened too wide, the excessive speed of the propeller will again close the wings, and as the propeller slows down, the wings are again opened, but will not be opened as wide as during the previous operation. This action may be repeated until the governor may either be completely closed or opened just sufficiently, even under a strong wind, as to permit the propeller to be driven at a normal speed. The automatic governor controlling and operating mechanism is not intended to control the speed of rotation of the propeller, but is designed more especially to afford protection against excessive speed of the propeller during a tornado, hurricane or the like.

The manual and automatic operating means for the governor shaft and the step bearing and power transmitting gearing for the propeller shaft are housed within a shed or house 144 within the lower portion of the tower frame.

Having thus described the invention, what is claimed as new is:—

1. In a wind motor, a propeller, a governor controlling the flow of air to the propeller, and automatic means controlling the governor and operated by the propeller including provisions for releasing the governor from the propeller when the governor has been moved by the propeller.

2. In a wind motor, a propeller, a governor controlling the flow of air to the propeller, and an operative connection between the propeller and governor for operating the governor from the propeller and including a clutch controlled by the speed of the propeller and a second clutch controlled by the position of the governor.

3. In a wind motor, a propeller, a governor controlling the flow of air to the propeller, an operative connection between the propeller and governor for operating the governor from the propeller and including two clutches, means controlled by the speed of the propeller for controlling one clutch, and means controlled by the position of the governor for controlling the other clutch.

4. In a wind motor, a propeller, a governor controlling the flow of air to the propeller, and automatic means controlling the governor and operated by the propeller when the propeller speed is increased and decreased to predetermined amounts for closing and opening the governor, respectively, and controlled by the governor to release the governor from said propeller when the governor is closed and opened by the propeller.

5. In a wind motor, a propeller, a governor controlling the flow of air to the propeller, and operative connections between the propeller and governor for opening and closing the governor by power from the propeller, each operative connection including two clutches, one controlled by the speed of the propeller and the other controlled by the position of the governor.

6. In a wind motor, a propeller, a governor controlling the flow of air to the propeller, operative connections between the propeller and governor for opening and closing the governor by power from the propeller, each operative connection including two clutches, means controlled by the speed of the propeller controlling one clutch of each operative connection for alternately closing said clutches when the speed of the propeller is increased and decreased to predetermined amounts, so that the governor is closed and opened, respectively, and means controlled by the position of the governor and controlling the other clutches for alternately opening them when the governor is closed and opened, respectively, by the propeller.

7. In a wind motor, a propeller, a governor for controlling the flow of air to the propeller, and means controlling the governor operated by the propeller and having provisions for releasing the governor from the propeller when the governor has been moved.

8. In a wind motor, a propeller, a governor controlling the flow of air to the propeller, an operative connection between the propeller and governor for operating the governor by power from the propeller, means controlling said connection, and means for releasing the governor from the propeller when the governor has been moved by said propeller.

9. In a wind motor, a propeller, a rotary shaft operated thereby, a governor controlling the flow of air to the propeller, a shaft controlling the governor and rotatable in opposite directions to open and close the governor, two wheels rotatable on the propeller operated shaft, two wheels rotatable on the governor control shaft and operably connected to the firstnamed wheels to be rotated thereby in opposite directions, speed controlled clutch means for alternately connecting the firstnamed wheels to the propeller operated shaft when the speed of the propeller is increased and decreased to predetermined amounts, and clutch means controlled by the rotation of the governor control shaft for alternately connecting the secondnamed wheels to the governor control shaft and arranged to disconnect the respective secondnamed wheel from the governor control shaft, when such wheel has been operated by the propeller operated shaft to open or close the governor, and to connect the other secondnamed wheel to the governor control shaft.

10. A wind motor comprising a frame, a propeller mounted therein, and a governor controlling the flow of air to the propeller and including wings hingedly mounted in the frame and having offset inner edge portions movable with the wings and arranged adjacent to the hinges so that the outer edge portions of the companion wings are seatable in said offset portions when the wings are closed.

11. A wind motor comprising a frame, a propeller mounted in the frame, governor wings for controlling the flow of air to the propeller, pivot members having portions fitted astride said wings, and bearings carried by the frame in which said pivot members are mounted to hingedly mount said wings in the frame.

12. A wind motor comprising a frame, a propeller mounted in the frame, governor wings for controlling the flow of air to the propeller, each wing having an offset edge portion against which the opposite edge of the companion is seatable when the wings are closed, pivot members having portions fitting astride the wings at the ends of said offset portions, and bearings carried by the frame in which the pivot members are mounted to hingedly support said wings.

In testimony whereof I hereunto affix my signature.

OMER T. ADAMS.